US006765139B2

(12) United States Patent
Belli

(10) Patent No.: US 6,765,139 B2
(45) Date of Patent: Jul. 20, 2004

(54) DRUMHEAD AND TENSIONING APPARATUS

(76) Inventor: Remo D. Belli, 28101 Industry Dr., Valencia, CA (US) 91355

( * ) Notice: Subject to any disclaimer, the term of this patent is extended or adjusted under 35 U.S.C. 154(b) by 0 days.

(21) Appl. No.: 10/307,854

(22) Filed: Dec. 3, 2002

(65) Prior Publication Data

US 2004/0103774 A1 Jun. 3, 2004

(51) Int. Cl.[7] ................................................ G01D 13/02

(52) U.S. Cl. ....................................... 84/411 R; 84/421

(58) Field of Search ............................... 84/411 R, 421, 84/413, 415, 416, 41 A

(56) References Cited

U.S. PATENT DOCUMENTS 5,419,230 A * 5/1995 Ocheltree et al. ............. 84/415
5,447,087 A * 9/1995 Hawes et al. ................. 84/413
5,841,049 A * 11/1998 Strawn ..................... 84/411 R
6,552,253 B1 * 4/2003 Chen ........................... 84/413

* cited by examiner

*Primary Examiner*—Kimberly Lockett
(74) *Attorney, Agent, or Firm*—Rapkin, Gitlin & Beaumont

(57) ABSTRACT

An improved drumhead and tensioning apparatus comprising a flat annular hoop having a generally flat upper member and a generally flat lower member parallel to and spaced apart from the flat upper member. Disposed and secured between the flat upper and lower members is a material for constituting a drumming surface which is entirely planar and when joined with the annular hoop, forms a generally uniformly flat drumhead. Around the periphery of the drumhead are a plurality of openings for receiving tensioning bolts with threaded ends. Also provided are a generally flat annular counterhoop and a suspension ring with each having a plurality of spaced apart openings for receiving and engaging the tensioning bolts. The suspension ring includes a vertically projecting collar member with an upper edge portion, which is integrally formed with the suspension ring as a single, unitary component. The collar member may also be provided as a separate and independent element supported at its base by the separate suspension ring. The drumhead is disposed between the annular counterhoop and the suspension ring to enable the drumming surface material to uniformly engage and press against the upper edge portion of the collar member. Upon the insertion of the tensioning bolts into and through the aligned openings in the annular counterhoop, the drumhead and the suspension ring, and the rotation of the threaded end of each bolt into the corresponding threaded opening in the suspension ring, the annular counterhoop and the suspension ring compress and engage to gradually stretch and increase the tension of the drumming surface material.

12 Claims, 5 Drawing Sheets

DRUMHEAD AND TENSIONING APPARATUS

BACKGROUND OF THE INVENTION

1. Field of the Invention

The present invention relates generally to the area of musical instruments. More particularly, the invention is directed to an improved apparatus for tensioning and tuning a drumhead.

2. Description of the Prior Art

Drumhead tuning apparatuses have existed in the prior art for years. "Free-Floating Shell" tensioning devices, as they were once commonly referred to, combine a metal suspension ring, a conventional drumhead with a metal hoop and a die cast metal counterhoop. A drumshell attached either below the tensioning device or in between two sets of the devices (as with a snare drum) is employed to provide appropriate resonance and sound projection.

The prior art tensioning device is used most commonly in marching bands and drum corps, where there has been a continuing need and desire to increase the tensioning of the drumhead for better articulation and projection of the drum sounds in larger and wide open venues such as sports stadiums and outdoor parades. As the tensioning of the drumnheads increased in a continuing effort to accomplish these objectives and stronger materials were required for the heads, such as Kevlar®, it became necessary to design and construct components that were capable of withstanding these greater tensioning forces. The castings that were used were naturally more substantial in size and/or weight, and the number of tuning rods were increased to provide added tensioning capability. Unfortunately, these heavier and more cumbersome instruments became a physical burden to the musicians who carried them, particularly children in elementary school, middle school and even high school marching bands. The additional costs of these instruments also became an issue the expense continued to rise in line with the use of the larger and costlier components.

Accordingly, there became a need in the art for a drumhead and tensioning apparatus that achieved an enhanced articulation and projection of sound, especially in open venues, using lighter weight, less expensive and more efficiently designed components that have a strength and resiliency potential as great as or greater than their counterparts in the prior art.

SUMMARY OF THE INVENTION

In its preferred embodiment, the present invention provides an improved drumhead and tensioning apparatus comprising a flat annular hoop having a generally flat upper member and a generally flat lower member parallel to and spaced apart from the flat upper member. Disposed and secured between the flat upper and lower members is a material for constituting a drumming surface which is entirely planar and, when joined with the annular hoop, forms a generally uniformly flat drumhead. Around the periphery of the drumhead are a plurality of openings for receiving tensioning bolts with threaded ends.

Also provided are a generally flat annular counterhoop and a separate generally flat suspension ring with each having a plurality of spaced apart openings for receiving and engaging the tensioning bolts. Each of the openings in the suspension ring are typically threaded to enable a threaded connection with each of the tensioning bolts. The suspension ring supports a vertically projecting collar member with an upper edge portion. The collar member is provided as a separate and independent part supported at its base by the separate suspension ring. The collar member may also be fashioned to join or integrate with the suspension ring to form a single, unitary structure.

The drumhead is disposed between the annular counterhoop and the suspension ring to enable the drumming surface material to uniformly engage and press against the upper edge portion of the collar member. Upon the insertion of the tensioning bolts into and through the aligned openings in the annular counterhoop, the drumhead and the suspension ring and the rotation of the threaded end of each bolt into the corresponding threaded opening in the suspension ring, the annular counterhoop and the suspension ring compress and engage to gradually stretch and increase the tension of the drumming surface material.

Construction of the drumhead component of the invention can include the use of layers of film and high density fiberboard in a variety of combinations. Suitable adhesive is applied to bond the layers. Mechanical means, such as, for example, appropriate stitching around the periphery of the drumhead, can be used to add strength to the bond. The bond, or more importantly, the strength of the drumhead, increases as the flat annular hoop expands in width. This results from the increased surface to surface contact between the drumhead surface material and the upper and lower members of the annular hoop.

The annular hoop and the suspension ring are typically comprised of metal alloys, such as aluminum, or some other strong and resilient material. The collar member, if provided as an integral part of the suspension ring, is comprised of a similar alloy or other material.

Although annular is the preferred shape of the various elements of the present invention, other configurations may be employed, including oval, rectangular, square, triangular and a variety of other geometric shapes.

The drumhead and tensioning apparatus is adaptable for use with a large variety of percussion instruments including toms, snare drums, bass drums, tambourines, congas, bongos and an assortment of ethnic, marching and other drums. The invention can also be employed separately as a hand held drum with the collar member in any embodiment functioning essentially as the drumshell.

Accordingly, it is an object of the present invention to provide an improved drumhead and tensioning apparatus that enhances the articulation and projection of percussive sounds employing lighter weight and less expensive components that have a strength and resiliency potential as great as or greater than their counterparts in the prior art.

It is also an object of the present invention to provide an improved drumhead and tensioning apparatus that combines a flat planar drumhead disposed between a flat counterhoop and a suspension ring incorporating a vertically projecting edge, which are adapted to be pressed together to stretch and increase the tension in the drumming surface material.

It is yet another object of the present invention to provide an improved drumhead and tensioning apparatus that employs an annular ring with a vertically projecting edge as a component separate and apart from though supported by the suspension ring.

It is yet another object of the present invention to provide an improved drumhead and tensioning apparatus that includes a drumhead material component mounted in and disposed between the upper and lower components of a flat annular hoop having substantial width to enable an increase in the surface area contact among the components and concomitant bond strength.

It is yet another object of the present invention to provide an improved drumhead and tensioning apparatus that is adaptable for use as a drumhead with a wide variety of drums, including toms, snares, bass drums, congas, ethnic, marching and others.

Yet still another object of the present invention to provide an improved drumhead and tensioning apparatus that is adaptable for use with a conventional drumshell.

Yet still another object of the present invention to provide an improved drumhead and tensioning apparatus that is easy and cost effective to manufacture.

Other objects and advantages of the present invention will become apparent in the following specifications when considered in light of the attached drawings wherein the preferred embodiment of the invention is illustrated.

DETAILED DESCRIPTION OF THE PREFERRED EMBODIMENT

Figure 1:
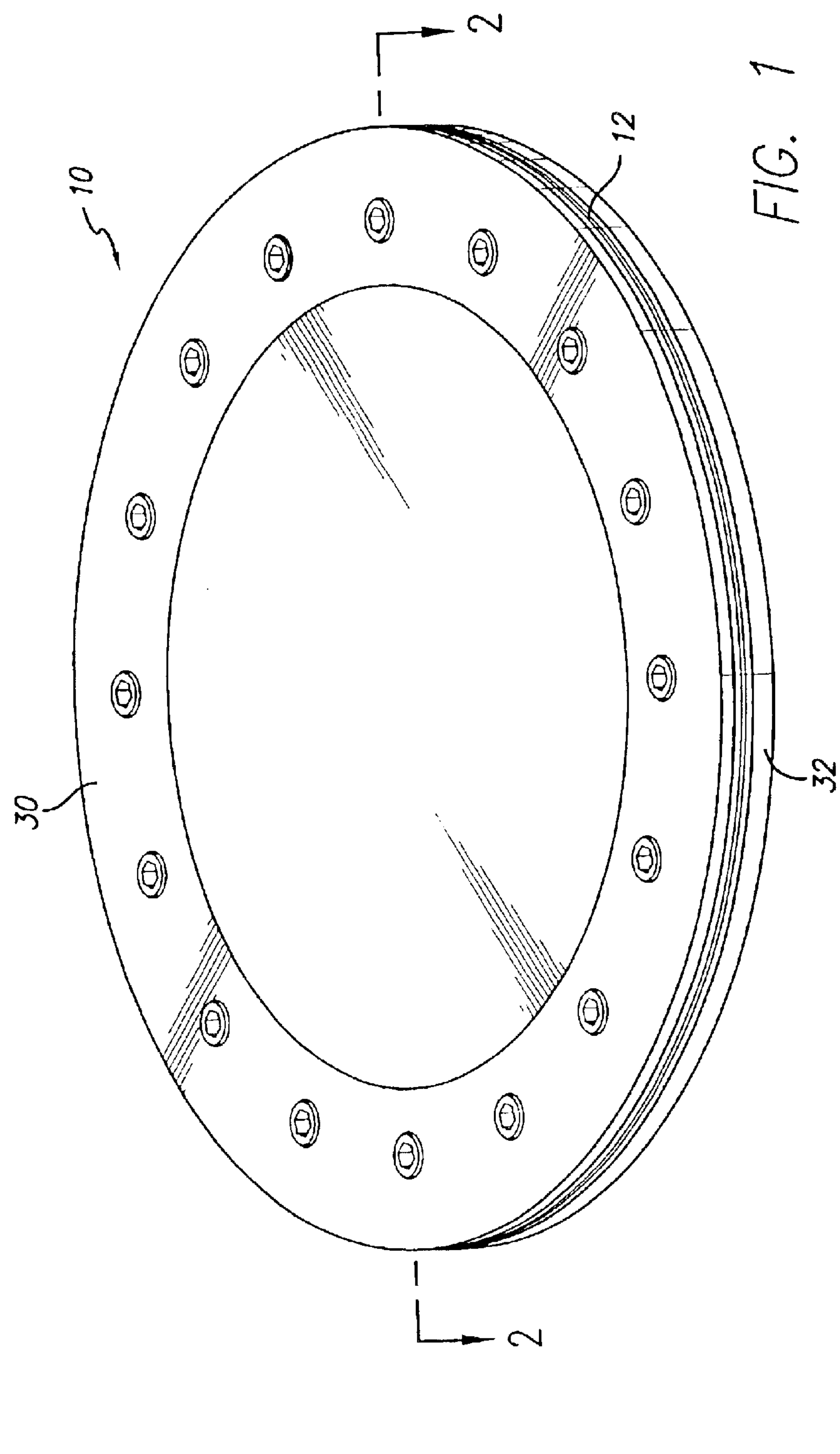
FIG. 1 is a perspective view of the preferred embodiment of the drumhead and tensioning apparatus of the present invention.
Figure 2:
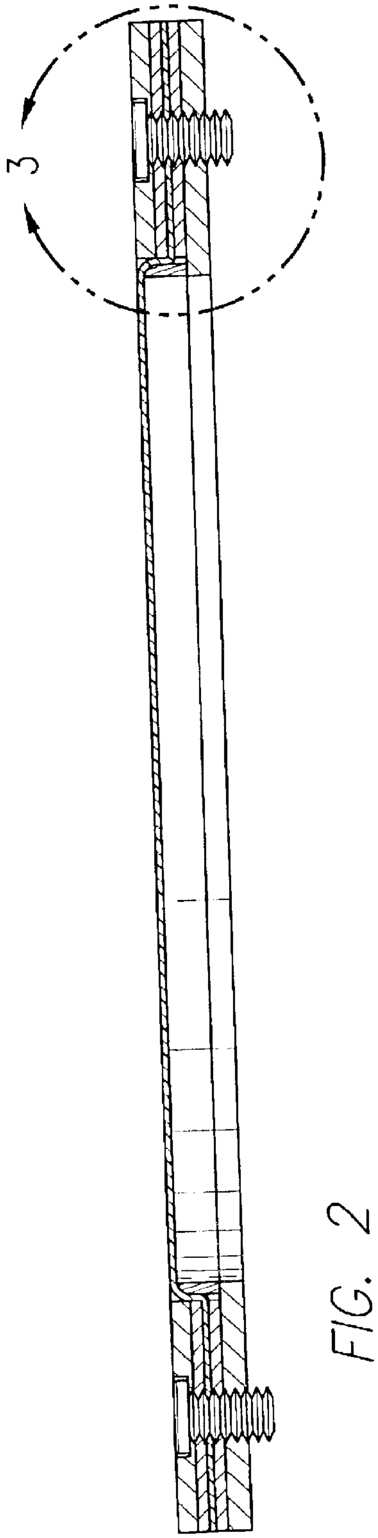
FIG. 2 is a cross-sectional view of the drumhead and tensioning apparatus of the present invention taken along line 2—2 of FIG. 1.
Figure 3:
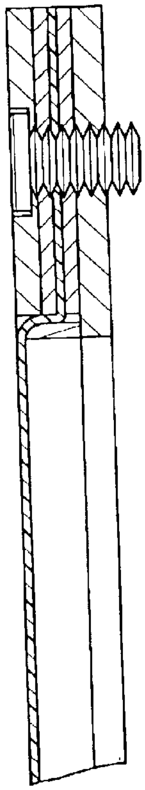
FIG. 3 is a cross sectional view of the drumhead and tensioning apparatus of the present invention taken along line 3 of FIG. 2.
Figure 4:
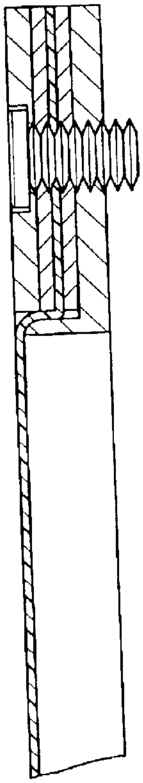
FIG. 4 is a cross-sectional view of an alternative embodiment of the drumhead and tensioning apparatus of the present invention.
Figure 5:
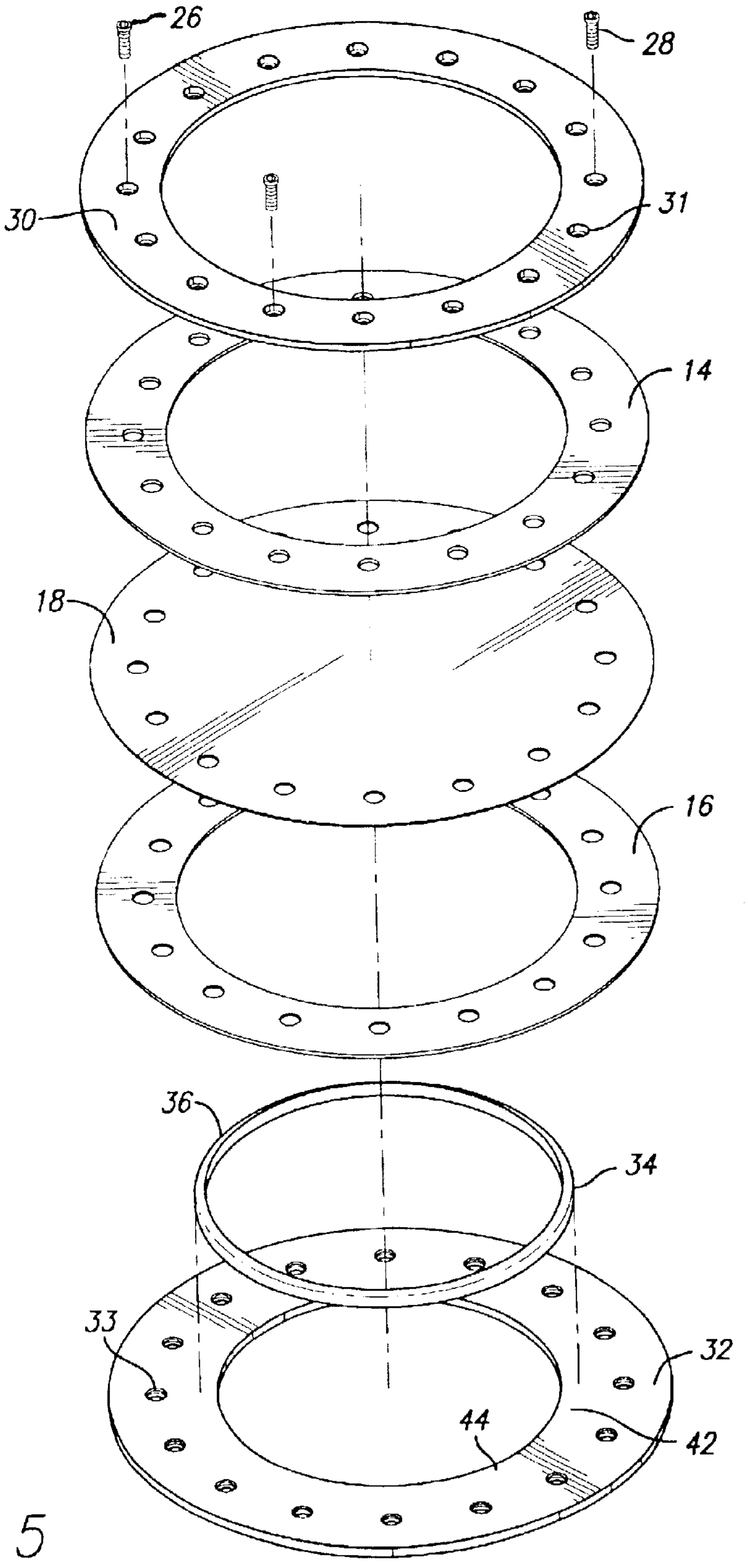
FIG. 5 is an exploded view of the components of the preferred embodiment of the drumhead and tensioning apparatus of the present invention.

FIG. 1 depicts a perspective view of the preferred embodiment of the present invention designated generally as 10. Drumhead and tensioning apparatus 10 comprises an annular hoop 12 having a generally flat, horizontal upper member 14 and a generally flat, horizontal lower member 16 parallel to and spaced apart from upper member 14. A material 18 for constituting a drumming surface is disposed and secured (using any suitable bonding or attachment means) between upper member 14 and lower member 16 to form a flat drumhead 20 having a plurality of spaced apart openings 22 disposed around the peripheral area 24 into which individual tensioning bolts 26 usually with threaded ends 28 are insertable. Annular hoop 12 may range in width from one inch to several inches depending on the diameter of drumhead 20, the thickness of material 18, the means employed to bond the components, and a variety of other factors. Generally, the wider the bonded portion of the annular hoop the greater the surface to surface contact that exists between the hoop's flat components and the drumming surface material 18 disposed and secured in between. The more surface area contact there is, the greater the ability of the drumhead to withstand the stresses associated with increases in tensioning and prevent the normally concomitant separation and failure of the drumhead components.

Figure 7:
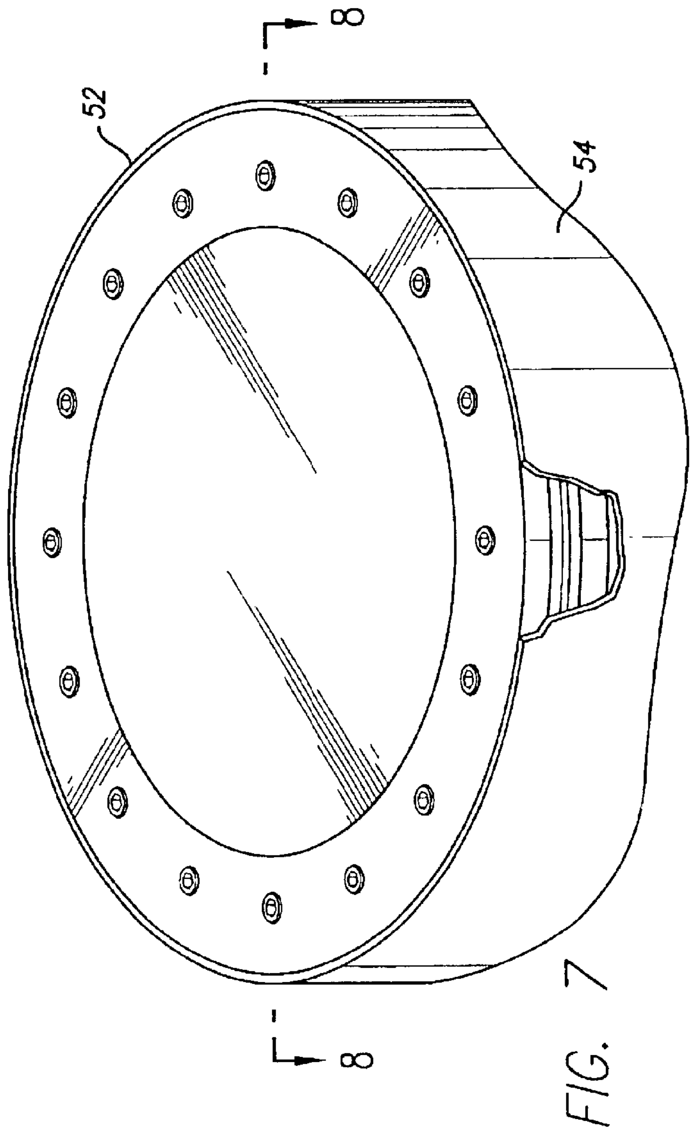
FIG. 7 is a perspective view of the drumhead and tensioning apparatus of the present invention shown installed in a conventional drumshell.
Figure 8:
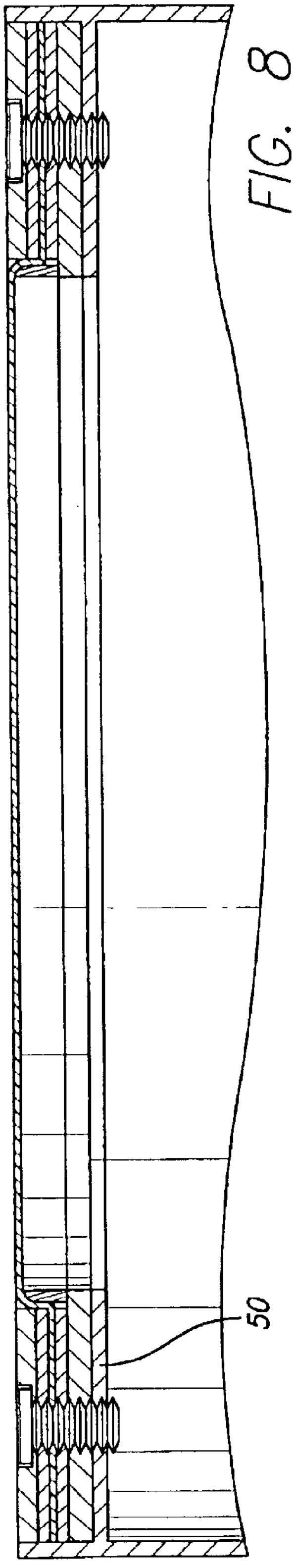
FIG. 8 is a cross-sectional view of the drumhead and tensioning apparatus of the present invention taken along line 8—8 of FIG. 7.

Drumhead and tensioning apparatus 10 in either of its embodiments, as described heretofore and depicted in the drawings, can be played independently as a drum or combined with a conventional drumshell of any size and diameter, as shown in FIGS. 7 and 8. In this latter application, ridge 50, which may be a separate component or integrally formed with drumshell 54, is constructed just below upper edge 52 of drumshell 54 to support drumhead and tensioning apparatus 10 and secure it using any suitable means.

Drumhead and tensioning apparatus 10 also comprises a generally flat, horizontal annular counterhoop 30 and a generally flat, horizontal suspension ring 32. Both have a plurality of spaced apart openings 31, 33 respectively, therein for receiving and engaging threaded tensioning bolts 26. Also provided in concert with suspension ring 32, as a separate component, is a vertically oriented annular projecting collar 34 with an upper edge portion 36. In this embodiment of the invention, suspension ring 32 has the same exterior diameter or dimensions as counterhoop 30, but has a slightly smaller interior diameter or dimension as a result of an overall wider band 42. Ridge 44, which is formed around the interior edge of band 42, acts as a support base for collar 38.

Figure 6:
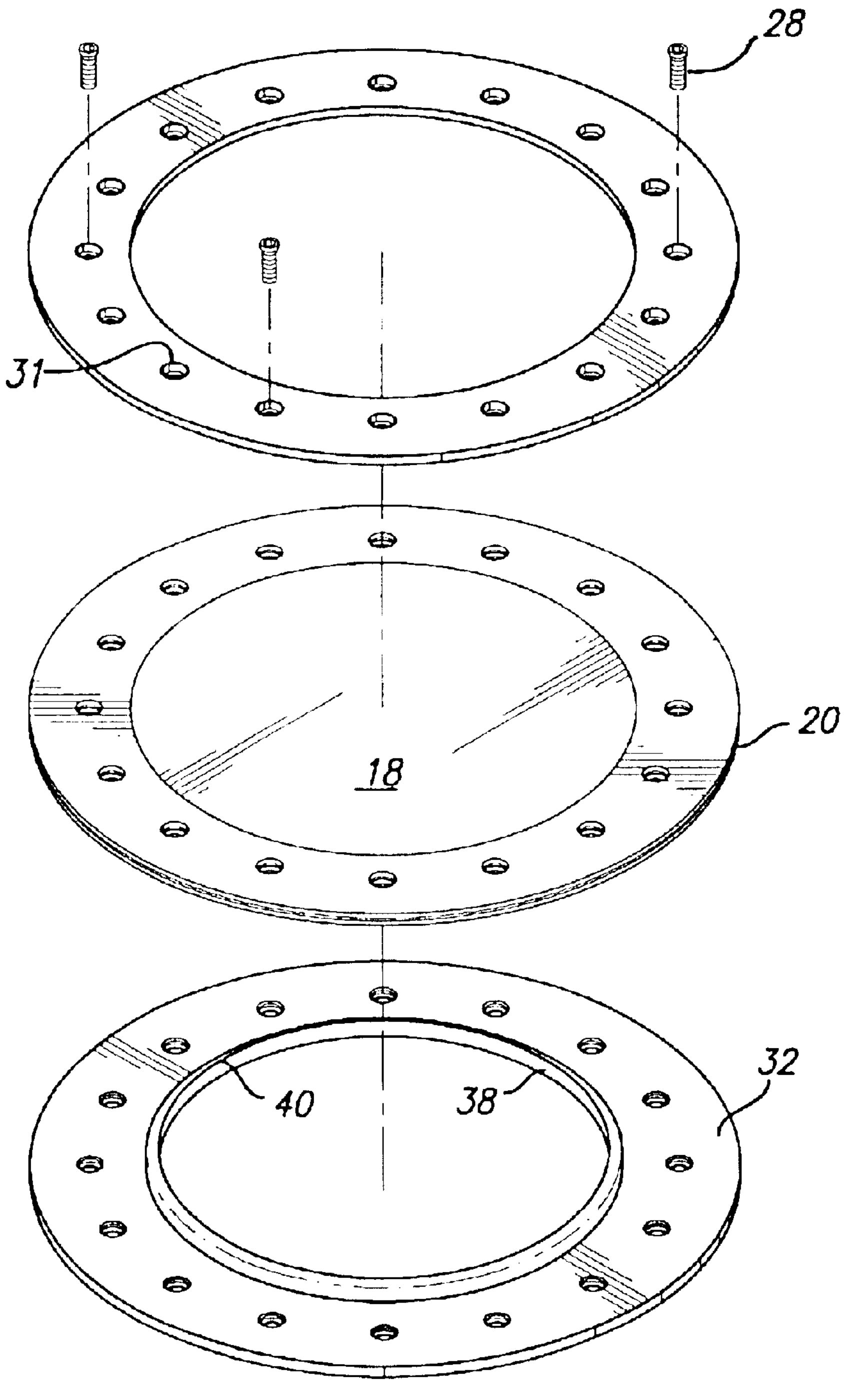
FIG. 6 is an exploded view of the components of an alternative embodiment of the drumhead and tensioning apparatus of the present invention.

In the alternative embodiment of the present invention depicted in FIG. 6, the collar may also be employed as an integral component of suspension ring 32, as collar 38. Collar 38 includes upper edge portion 40.

Drumhead 20, employing either embodiment of the present invention, is disposed between annular counterhoop 30 and suspension ring 32 to enable drumming surface material 18 to uniformly engage upper edge portions 36, 40 of collars 34, 38, respectively.

Upon the insertion of tensioning bolts 26 into and through the aligned openings 22 in drumhead 20, annular counterhoop 30 and suspension ring 32 (employing integral collar 34 or collar 38 as a separate component) and the rotational mating of the bolts 26 with the openings 22, annular counterhoop 30 and suspension ring 32 compress and engage to stretch and increase the tension of material 18. Accordingly, in contrast with the prior art devices, there is a significantly greater ability with the apparatus of the present invention for the tensioned drumhead to withstand the often predictable failure of the bond between the flat hoop components and the drumming surface material and their eventual separation.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

What is claimed is:

1. A drumhead and tensioning apparatus comprising:

an annular hoop having a generally flat, horizontal upper member and a generally flat horizontal lower member parallel to and spaced apart from said flat, horizontal upper member, and a material for constituting a drumming surface disposed and secured between said generally flat, horizontal upper and lower members, to form a flat drumhead having a plurality of spaced apart openings therein around the drumhead periphery, a plurality of tensioning bolts, a generally flat, horizontal annular counterhoop having a plurality of openings therein for receiving said tensioning bolts, a generally horizontal suspension ring having a plurality of threaded openings therein for receiving and engaging said tensioning bolts and a vertically oriented annular projecting collar member integrally formed therewith, said collar member having an upper edge portion, wherein said drumhead is disposed between said generally flat, horizontal annular counterhoop and said flat, horizontal suspension ring such that said drumming surface material uniformly engages the upper edge portion of said vertically oriented annular projecting collar member and upon the insertion of said tensioning bolts into and through said aligned openings in said annular counterhoop, said drumhead and said suspension ring, and the rotational mating of each of said bolts with a corresponding said threaded opening in said suspension ring, said annular counterhoop and said suspension ring compress and engage to stretch and increase the tension of said material.

2. The invention of claim 1 wherein said drumhead and tensioning apparatus is mated to a drumshell.

3. The invention of claim 1 wherein said annular counterhoop and said suspension ring are comprised of a metal alloy.

4. The invention of claim 1 wherein said flat, horizontal upper and lower members are each comprised of one or more sheets of material.

5. The invention of claim 4 wherein said material comprises fiberboard.

6. The invention of claim 1 wherein said material for constructing a drumming surface is comprised of polyester.

7. The invention of claim 1 wherein said flat, horizontal upper and lower members and said material for constituting a drumming surface are secured by an adhesive compound.

8. The invention of claim 1 wherein said flat, horizontal upper and lower members and said material for constructing a drumming surface are stitched together.

9. A drumhead and tensioning apparatus comprising:

an annular hoop having a generally flat, horizontal upper member and a generally, flat horizontal lower member parallel to and spaced apart from said flat, horizontal upper member, and a material for constituting a drumming surface disposed and secured between said generally flat, horizontal upper and lower members, said hoop and said material joining to form a drumhead, a plurality of tensioning bolts, each of said bolts having a threaded end, a generally flat, horizontal annular counterhoop having a plurality of openings therein for receiving said tensioning bolts, a generally flat, horizontal suspension ring having a plurality of threaded openings therein for receiving and engaging said tensioning bolts and a vertically oriented annular projecting collar member integrally formed therewith, said collar member having an upper edge portion, wherein said drumhead is disposed between said generally flat, horizontal annular counterhoop and said flat, horizontal suspension ring such that said drumming surface material engages the upper edge portion of said vertically oriented annular projecting collar and upon the insertion of said tensioning bolts into and through said aligned openings in said annular counterhoop, said drumhead and said suspension ring, and the rotational mating of each of said bolts with a corresponding said threaded opening in said suspension ring, said annular counterhoop and said suspension ring are gradually compressed to stretch and increase the tension of said material.

10. A drumhead and tensioning apparatus comprising:

a hoop having a generally flat upper member and a generally flat lower member parallel to and spaced apart from said generally flat upper member, and a material for constituting a drumming surface disposed and secured between said generally flat upper and lower members, joined to form a drumhead, a plurality of threaded tensioning bolts and mating threaded nuts, a generally flat counterhoop member having a plurality of openings therein for receiving said tensioning bolts, a suspension base member having a plurality of threaded openings therein for receiving and engaging said tensioning bolts and a vertically oriented projecting collar member integrally formed therewith, said collar member having an upper edge portion, wherein said drumhead is disposed between said generally flat counterhoop member and said suspension base member such that said drumming surface material uniformly engages the upper edge portion of said vertically oriented projecting collar member and upon the insertion of said tensioning bolts into and through said aligned openings in said counterhoop member and said suspension base member and the rotation of mating of each of said bolts with a corresponding said threaded nut, said counterhoop member and said suspension base member are compressed to stretch and increase the tension of said material.

11. A drumhead and tensioning apparatus comprising:

a drumhead having a material constituting a drumming surface disposed thereon, a plurality of threaded tensioning bolts, a generally flat, annular counterhoop having a plurality of openings therein for receiving said tensioning bolts, a suspension ring having a plurality of threaded openings therein for receiving and engaging said tensioning bolts and a vertically oriented projecting collar member integrally formed therewith, said collar member having an upper edge portion, wherein said drumhead is disposed between said generally flat annular counterhoop and said suspension ring such that said drumming surface material uniformly engages the upper edge portion of said vertically oriented projecting collar member and upon the insertion of said threaded tensioning bolts into and through said aligned openings in said annular counterhoop and said suspension ring and the rotational mating of each of said bolts with a corresponding said threaded opening in said suspension ring, said annular counterhoop and said suspension ring are compressed to stretch and increase the tension of said material.

12. A drumhead and tensioning apparatus comprising:

an annular hoop having a generally flat, horizontal upper member and a generally flat horizontal lower member parallel to and spaced apart from said flat, horizontal upper member, and a material for constituting a drumming surface disposed and secured between said generally flat, horizontal upper and lower members, to form a flat drumhead having a plurality of spaced apart openings therein around the drumhead periphery, a plurality of threaded tensioning bolts, a generally flat, horizontal annular counterhoop having a plurality of openings therein for receiving said threaded tensioning bolts, a generally horizontal suspension ring having a plurality of threaded openings therein for receiving and engaging said tensioning bolts, a vertically oriented annular projecting collar member having an upper edge portion, wherein said drumhead is disposed between said generally flat, horizontal annular counterhoop and said flat, horizontal suspension ring such that said drumming surface material uniformly engages the upper edge portion of said vertically oriented annular projecting collar member and upon the insertion of said tensioning bolts into and through said aligned opening in said annular counterhoop, said drumhead and said suspension ring, and the rotational mating of each of said threaded bolts with a corresponding said threaded opening in said suspension ring, said annular counterhoop and said suspension ring compress to stretch and increase the tension of said material.

* * * * *